Patented June 12, 1923.

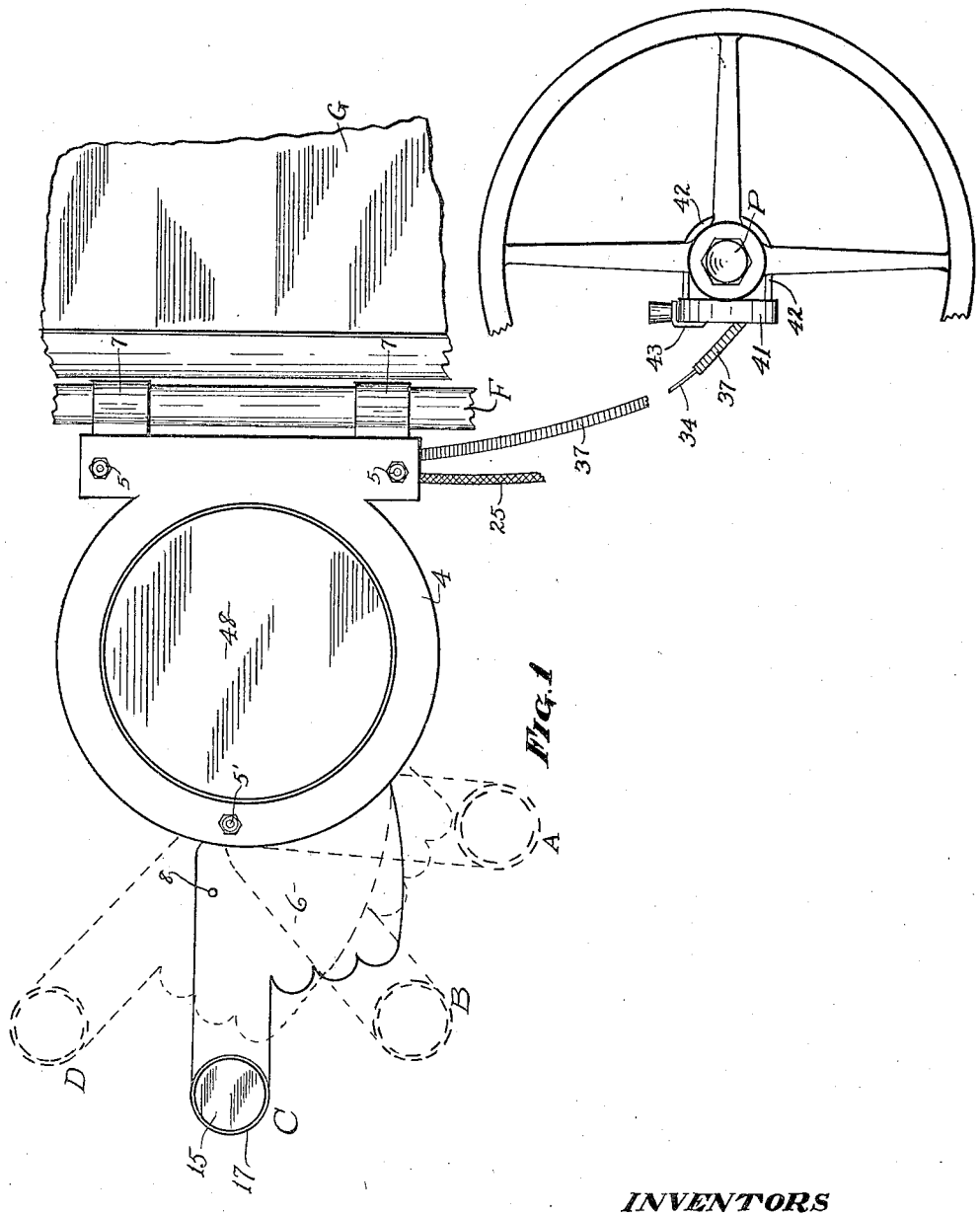

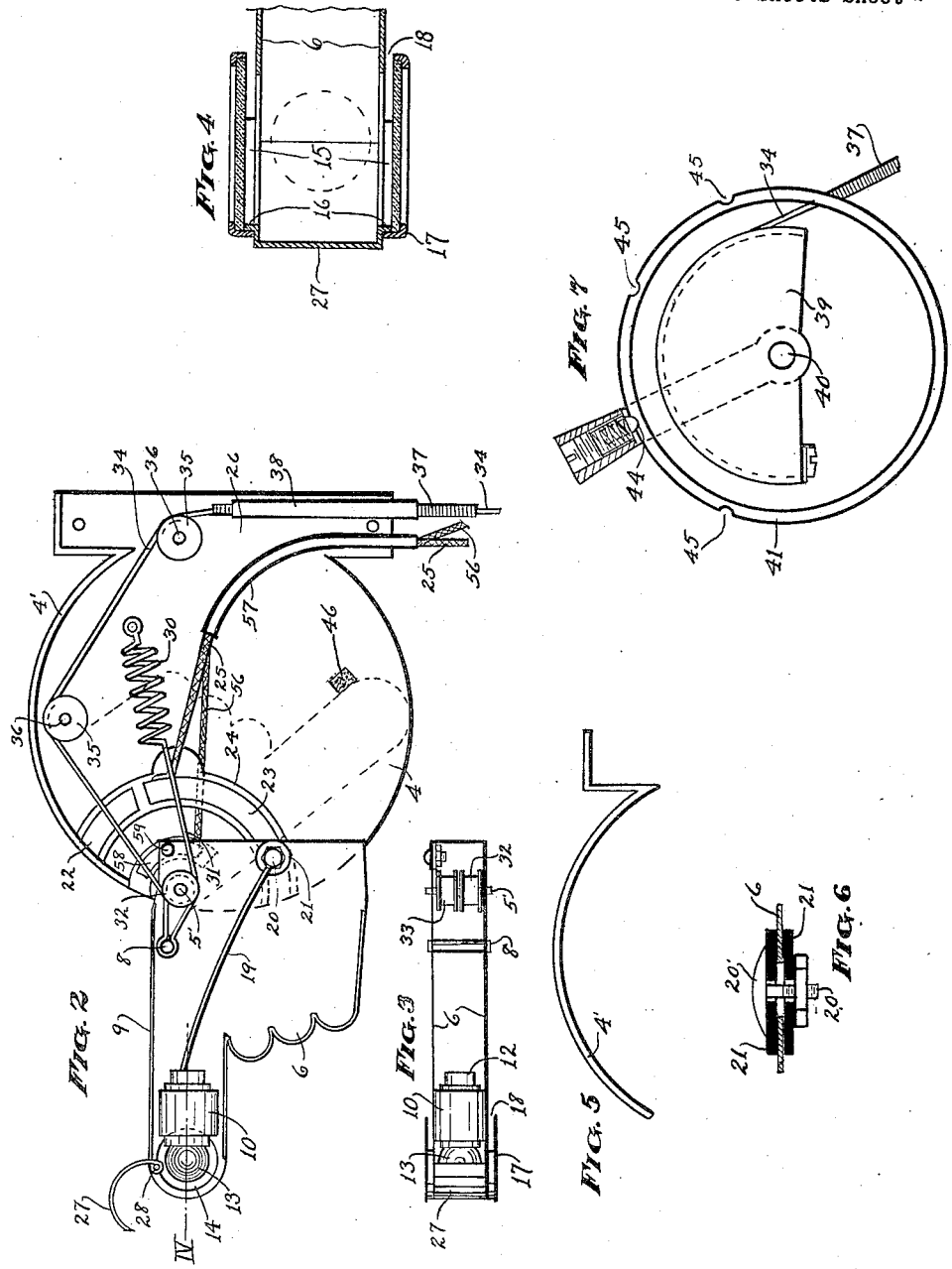

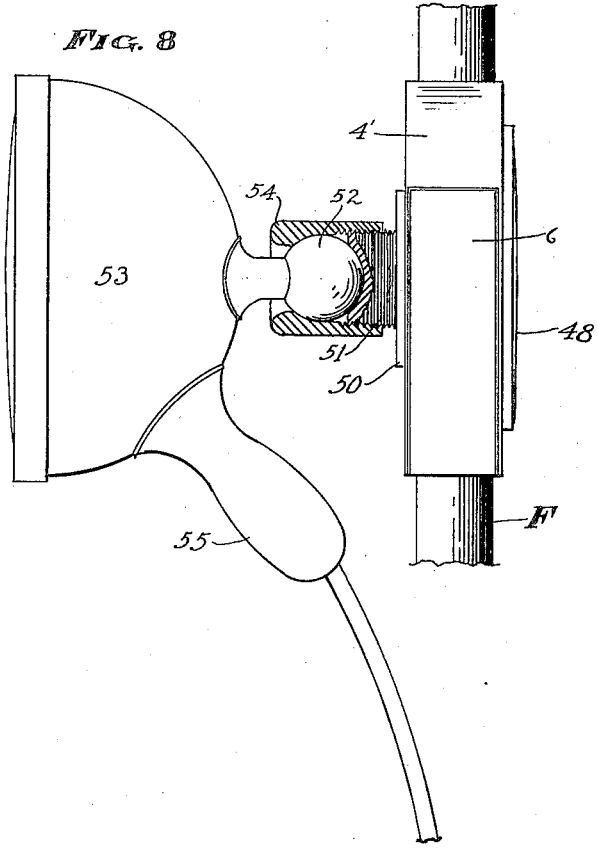

1,458,703

UNITED STATES PATENT OFFICE.

DANIEL L. HARRIS, GEORGE L. COFFMAN, AND HEIM W. RESNICK, OF WICHITA, KANSAS, SAID HARRIS ASSIGNOR OF ONE-SIXTH TO RAY G. ROGERS, OF PONCA CITY, OKLAHOMA.

COMBINED SIGNAL, SPOTLIGHT, AND MIRROR.

Application filed March 14, 1921. Serial No. 452,356.

*To all whom it may concern:*

Be it known that we, DANIEL L. HARRIS, GEORGE L. COFFMAN, and HEIM W. RESNICK, citizens of the United States, and residents of Wichita, in the county of Sedgwick and State of Kansas, have jointly invented a certain new and useful Combined Signal, Spotlight, and Mirror, of which the following is a specification.

Our invention relates to a combined signal, spot light and rear-vision mirror; and one object of our invention is to produce in a single commercial article a combination of the instruments mentioned, for use on motor vehicles.

A further object is to produce an improved traffic signal of the semaphore type, that is easily installed upon a motor car and comprises no shafts nor gearing, and that is operated by a single lever located in convenient position to the driver's hand and close to the steering wheel. The signaling device is so constructed as to indicate to other drivers, and pedestrians, the intended stopping, backing or turning of the car, and the direction of such turning. The signal comprises, essentially, a housing provided with means for attachment to a windshield-frame, and a pivotally mounted hand or pointer, and manually-operable means for setting the pointer to several different position-angles.

Reference is now had to the accompanying drawings, which are partly diagramatic but show the essential features of the invention and the mode of operation. In said drawings, Fig. 1 is a rear elevation of the signal and mirror, with parts of a motor car to which it may be attached, the control-wire being broken; Fig. 2 is an interior elevational view of the signal proper; Fig. 3 is a top plan view of the pointer, omitting certain parts; Fig. 4 is a detail view taken on section line IV of Fig. 2, showing the lens arrangement; Fig. 5 is a detail view of part 6; Fig. 6 is a sectional detail view of one of the electric contact devices; Fig. 7 is a detail view of the control-lever and quadrant, detached; Fig. 8 shows the spot light partly in side elevation and partly in section, with the signal and mirror in elevation.

Referring now to Fig. 1: F denotes an upright member of the outer frame F of a motor-car windshield G. 4 is a circular housing composed of parallel plates 4 connected by bolts 5, 5' and provided with a metal cover 4'. The housing is rigidly attached to the member F by a pair of clamps or clips 7, of any suitable construction. If made of sheet metal, said clips may be integral with one of the plates 4.

The bolt 5' forms a pivot for the pointer 6, which is formed by duplicated plates 6, connected by a bolt 8 and by a cover-plate 9. Fixed between said plates is a receptacle 10 for a lamp base 12 in which is a bulb 13, located at the outer end of the pointer. Concentric with the bulb, circular openings 14 are cut in the plates 6, and a pair of colored glass lenses 15 are mounted over said openings as shown in detail by Fig. 4. Each lens is spaced outward by a ring 16 and held in position by an outer flanged ring 17, soldered to the adjacent plate. To permit the light of the lamp 13 to shine laterally on the outer faces of the pointer, the spacing rings 16 are cut away on the side facing the pivot, forming slits 18.

The insulated wire 19 from receptacle 10, which is of the one-wire type, is led to an insulated bolt 20 of which Fig. 6 is a detail view. Said bolt has a convex head 20' which contacts either of two conducting segments 22, 23, mounted on an insulating plate 24 secured to one of the plates 4. An insulated wire 25 is connected to the most convenient wire of the lighting system of the car, which is here assumed to be of the one-wire type. The segments 22, 23 are concentric with the pivot 5' about which the pointer is movable.

To protect the bulb 13 from breakage, a curved shield 27 is mounted on a pivot 28 whereby the shield may be raised to permit the removal or insertion of a bulb.

Normally, the pointer is fully concealed by the housing, being at the position indicated by one set of dotted lines on Fig. 2. It is tensioned toward this position by a spring 30, having a wire or cable end 31 passing under a grooved roller 32 and anchored to the bolt 8.

The pointer is actuated against said spring by means of a "Bowden" wire which is a sheathed wire of the kind used in motorcycle controls. One end of this wire 34 is anchored to the stud or bolt 8 in the pointer and is wound once around a roller 33, thence passed over grooved rollers 35, mounted on pins 36.

The flexible helical tube 37 in which the wire 34 is slidable, passes through a sleeve 38, secured to plate 4, thence to a sector drum 39, mounted on a shaft 40 held by a quadrant 41 which is mounted on the steering column P by means of a clip 43. Secured on shaft 40 is a short lever 43, provided with a spring-pressed latch 44 which engages one of a series of notches 45 in the periphery of the quadrant. These notches correspond to four extended position angles of the pointer 6, which positions are all indicated on Fig. 1. By moving the lever 43 to first notch, the pointer will be turned down to position A and held there until the latch is released; shifting the lever to the second notch will turn the pointer to position B; and so on; the pointer being actuated by the traction of wire 34 upon the pin or bolt 5. Preferably, the lever latch 44 is made self-releasing.

A suitable bumper, indicated at 46, Fig. 2, may be provided as a stop for the return motion of the pointer to normal position.

Arbitrary meanings (as agreed on) are to be assigned to the several positions of the pointer, and said meanings may include "reverse" as well as "turn right" "turn left" and "stop."

The electric light 13 may be employed at night only if so preferred, by opening the circuit by a plug or switch (not shown) when the light is not desired. When the pointer is within its housing, the circuit through the lamp is broken, as the wiper head 20′ is out of contact with the live segment 23. But when the pointer is thrown to position A or farther, the wiper contacts the live segment and lights the lamp. This makes visible a colored light from both front and rear of the car, and a portion of the light, shining laterally through the slits 18, illuminates the body of the pointer on each side thereof, thus increasing its visibility.

On Fig. 1 we show, as an unessential attachment, a rear-vision mirror, 48, which may be mounted upon the back plate of the housing 4. This will be an added convenience to drivers, and adds an ornamental finish to the signal and its housing.

Several modifications in details of construction may be resorted to without exceeding the scope or departing from the principle of this invention.

Means are shown on Fig. 2, whereby the motion of the pointer to a signaling position will close an auxiliary circuit for any desired purpose. To effect this result a second battery-wire 56 is passed through the guide 57 and is connected to an insulated metal segment 58 mounted on plate 4. The pointer carries a button or wiping device 59, in electrical contact with the pointer (hence "grounded") and positioned to contact the segment 58 except when the pointer is at non-registering position.

A spot light of any construction similar to that shown on Fig. 8 of the drawings, may be made a part of the signal housing; the front plate 4 of said housing forms a suitable base for a flange 50 having a threaded stud 51 thereon. This stud is socketed to receive a ball-knob 52 on the stem of the spot light hood, 53. The sleeve-nut 54 holds the parts in place and provides any desired degree of friction. The angle of the light is adjustable by means of the handle 55 on the hood.

Having described our invention, we claim as new and desire to secure by Letters Patent:

In a combined signal, spot light and mirror, a housing member having a slot in the outer edge portion thereof; a hollow semaphore in the shape of a human hand pivotally mounted within the housing and normally concealed therein by spring means; means for outwardly and arbitrarily pivoting said semaphore through said slot against said spring resistance; an electric bulb in an electric circuit within the extended forefinger portion of the hand; colored lenses arranged on opposite sides of the bulb in openings through the side walls of the housing with slits adjacent thereto facing the point of pivot; and conducting segments concentric with the pivot cooperating with means on the pivotable semaphore for opening and closing the electric circuit to said bulb.

DANIEL L. HARRIS.
GEORGE L. COFFMAN.
HEIM W. RESNICK.

Witnesses:
M. Y. CHARLES,
W. A. NETHERCOT.